United States Patent [19]

Fahrenschon et al.

[11] B 4,009,342

[45] Feb. 22, 1977

[54] CIRCUIT ARRANGEMENT FOR COMMUNICATION FACILITIES WHEREIN TRANSMISSION PATHS CAN BE EMPLOYED FOR DIFFERENT TYPES OF MESSAGE SWITCHING

[75] Inventors: Franz Fahrenschon, Neuried; Horst Jäger, Munich; Hans Thinschmidt, Unterpfaffenhofen; Alfred Meier, Munich, all of Germany

[73] Assignee: Siemens Aktiengesellschaft, Berlin & Munich, Germany

[22] Filed: Apr. 18, 1974

[21] Appl. No.: 462,030

[44] Published under the second Trial Voluntary Protest Program on March 23, 1976 as document No. B 462,030.

[30] Foreign Application Priority Data

Apr. 19, 1973 Germany .......................... 2320092

[52] U.S. Cl. ............................ 179/2 DP; 178/4.1 B
[51] Int. Cl.² .......................................... H04M 11/00
[58] Field of Search ........................ 179/2 DP, 3, 4; 178/4.1 R, 4.1 B

[56] References Cited

UNITED STATES PATENTS 3,475,557  10/1969  Morse et al. ..................... 179/2 DP

FOREIGN PATENTS OR APPLICATIONS 1,191,411  10/1963  Germany .......................... 179/2 DP
1,223,872  4/1961   Germany .......................... 179/2 DP
1,206,639  9/1967   United Kingdom ............. 179/2 DP Primary Examiner—Thomas W. Brown

[57] ABSTRACT

Apparatus is described for telecommunication facilities having transmission paths capable of accommodating different types of message switching, e.g., voice communications and data communications. A changeover device in the subscriber stations in the system switches between the two modes of communication by means of a mode selector switch for causing manual or automatic switching between the two forms of communication. After switching through a call carried by a given connector set, a signal is automatically sent from the connector set to the called subscriber station. This signal causes an automatic changeover from the form of message communication being used to a second form, e.g., from voice to data. Upon completion of the changeover in the called subscriber station, acknowledgement of this fact is made by sending a back signal from the called station. Responsive to this acknowledgement, a signal is likewise sent to the calling subscriber station. This signal automatically effects a changeover in the calling station to the desired mode of message transmission, and this changeover is likewise acknowledged by a back signal. The changeover is reported to both subscriber stations participating in a call as an inquiry for acceptance of the desired message switching.

4 Claims, 3 Drawing Figures

Fig. 3
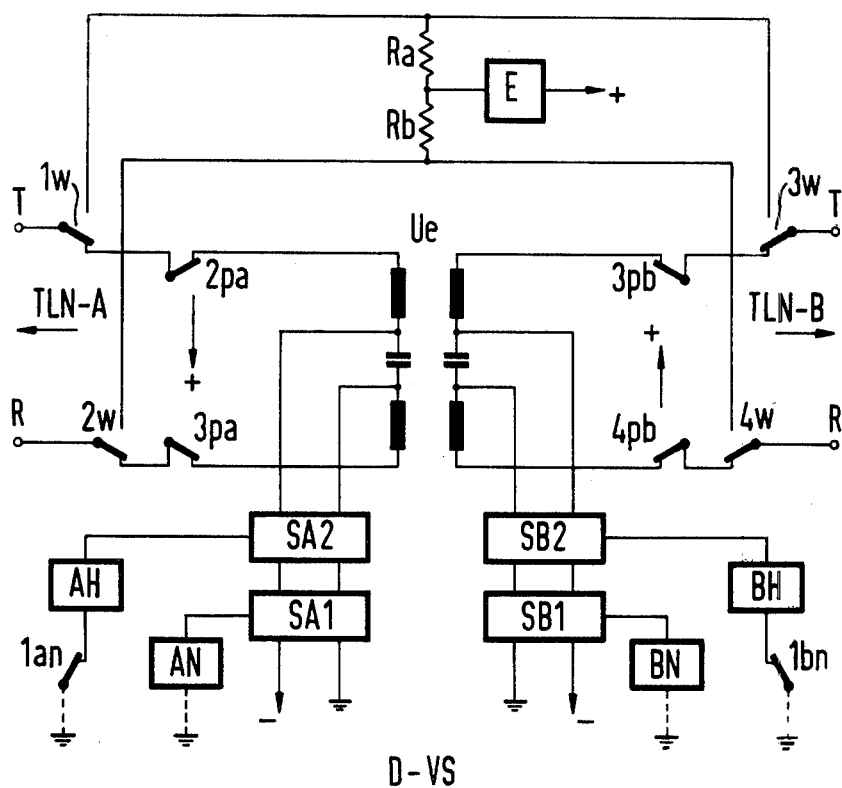
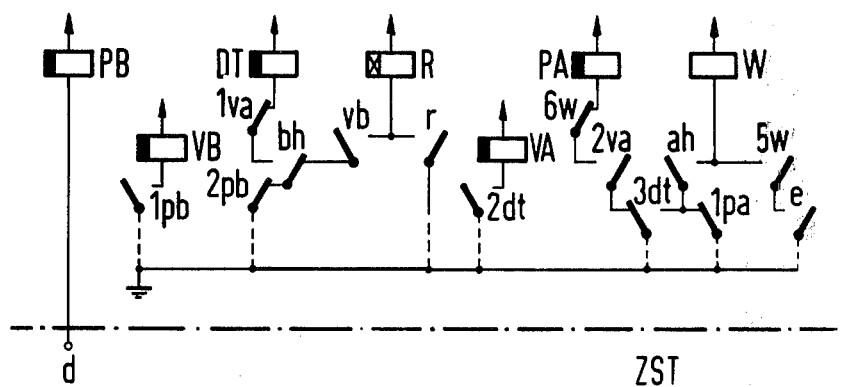

CIRCUIT ARRANGEMENT FOR COMMUNICATION FACILITIES WHEREIN TRANSMISSION PATHS CAN BE EMPLOYED FOR DIFFERENT TYPES OF MESSAGE SWITCHING

BACKGROUND OF THE INVENTION

The invention relates to communication facilities, wherein the transmission paths can be employed for different types of message switching, for example, voice communication by telephone and data communication. To satisfy the varying conditions in the switching facilities of such systems in the most economical way, there are provided various connector sets over which the individual calls are conducted. The connector sets can be selected in accordance with the type of message switching desired through a code selected prior to the call number identifying the desired distant station. As a rule, there are provided in the subscriber stations of such systems changeover facilities connecting the subscriber lines to one of the terminal units for the individual types of message switching.

Various modes of operation have been proposed for the control of the changeover means, for example, for voice and data communication.

In one of these modes of operation a distinction is made between remote stations and central stations. The central stations are equipped with a mode selector switch, so that the changeover means can be switched manually to the data terminal unit by operating a data button after the call has been placed, as well as directly by the call signal in the case of automatic operation. Upon interrogation of data of a remote station by the central station, automatic operation is not possible. It might, however, be possible to equip the remote stations also with a mode selector switch and with an automatic call discriminating means, as in the central stations. However, changeover by means of the call signal is a disadvantage in that upon setting the mode selector switch to automatic operation no incoming telephone traffic can be accepted, since the forward signal causes automatic switching to the data communication mode.

Another mode of operation for prior art telephone installations provides changeover facilities without a mode selector switch. The changeover to the data communication mode takes place by selectively operating a data button in one of the subscriber stations participating in a call. An appropriately equipped connector set detects this request and sends to both subscriber stations a changeover signal, whereby a switch back or a release of the connection can only be effected by the initiating subscriber station. Although this solution is advantageous in many respects, it differs substantially from the more common mode of operation referred to at the outset, and fully automatic operation is not possible.

It is an object of the invention to provide apparatus capable of a mode of operation which assigns priority to one type of message switching, viz. voice transmission and permits the selection between automatic and manual operation.

A further object is to provide such apparatus which is compatible with the other known mode of operation, independently of the selected type of transmission for the data communication, and wherein the number of operation possibilities is increased.

SUMMARY OF THE INVENTION

The foregoing and other objects are achieved by the invention in that after switching through a call conducted via a suitable connector set, a signal is sent from the connector set to the called subscriber station. This signal causes a changeover to the second type of messages in the case of automatic operation. The changeover, upon completion, is acknowledged by the called station by means of a back signal. As a result of this acknowledgement, a signal is, likewise, sent to the calling subscriber station, and this signal also causes the changeover to the desired type of messages in the automatic mode. The switchover, upon completion, is likewise acknowledged by a back signal. Subsequently, the switchover at both ends is reported to both subscriber stations participating in a call as an inquiry for the acceptance of the desired message switching.

The invention proceeds upon the basis that upon activation of a connector set suitable for several types of message swtiching, there is a definite intention of changing over from the type of message switching then being used to another type of message switching. The holding of such a separate connector set is, therefore, chosen as a starting point for initiating the switching of the changeover means at both ends of the transmission path. The switching operation commences first with the called party, since it cannot be foreseen whether the mode selector switch is set on the manual or the automatic mode. Therefore, a check is first made to ascertain whether the system is set on the automatic mode. If so, the signal sent to the distant station causes the instantaneous switching of the changeover means. This is acknowledged by the back signal. Thereafter, by means of signals to the calling station, the changeover is initiated there also. Since the latter changeover is likewise acknowledged, the second type of message switching can now be initiated by simultaneous signals to both subscriber stations. Thus, a fully automatic operation is possible, in particular in conjunction with automatic dial system equipments, without disabling the type of message switching initially used, for example, voice communication. This arises out of the fact that the changeover no longer takes place by means of the forward signal, as in the other known mode of operation.

Starting from this general solution, it is possible to make use of the mode of operation most commonly employed heretofore. This becomes possible, if, according to a further development of the invention, in the case of manual operation of the called subscriber station the changeover signal remains ineffective, and in the absence of the reply message the usual forward signal, suppressed heretofore, is sent by the connector set.

According to another development of the invention, the signal sent to the calling station comprises two partial signals. If the called station operates in the manual mode, and after manually switching to the second type of message switching, the first partial signal of the calling subscriber station will indicate the changeover of the distant station. In the case of manual operation, requests for manual switching to the other type of message, while in the automatic mode, will cause the second partial signal to directly carry out the changeover.

Thus, in addition to a fully automatic mode of operation, a fully manual, as well as a mixed mode of operation, are possible. Multiple switching back and forth is likewise possible between the two types of message switching as in the last-mentioned known mode of operation. This will take place, if the discontinuation of the readiness for operation of the connected data terminal units in both subscriber stations, which is monitored in the connector set, does not lead to the immediate release. In this case, however, the system is first switched back to the standard line monitor.

BRIEF DESCRIPTION OF THE DRAWINGS

The principles of the invention will be more readily understood by reference to the description of a preferred embodiment given hereinbelow in conjunction with the accompanying drawings of a circuit arrangement constructed according to the invention. This example is represented by a telephone switching system with voice communication and supplementary data communication.

FIG. 3 is a schematic diagram of a separate connector set for supplementary data communication.

DETAILED DESCRIPTION OF THE DRAWINGS

Figure 1:
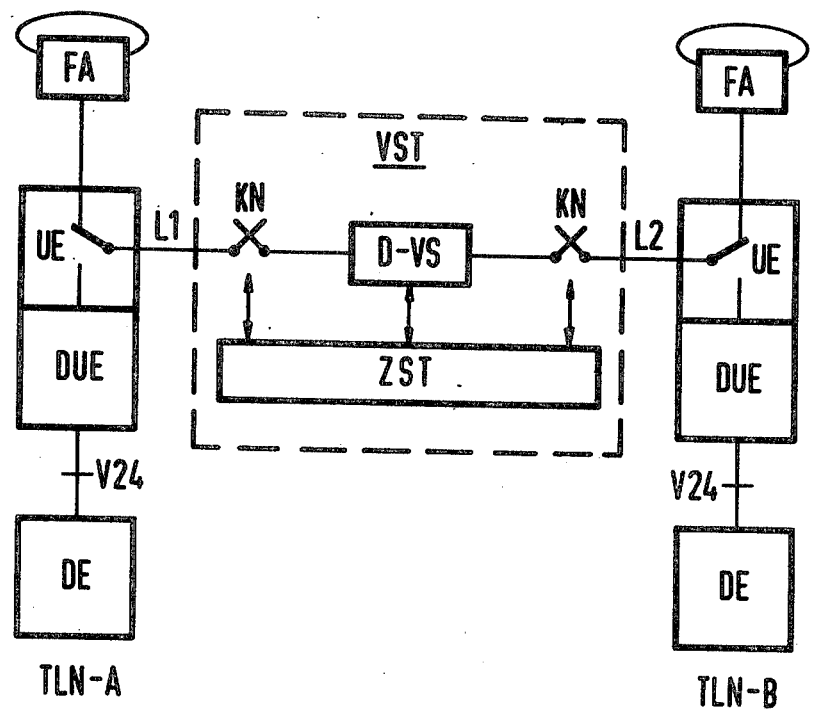
FIG. 1 is a block-schematic diagram of a complete system.

The block diagram in FIG. 1 shows two subscriber stations TLN-A and TLN-B, each comprising a telephone set FA and a data terminal unit DE connected to the data transmission unit DUE via an interface corresponding to CCITT recommendation V.24. Each of the individual components of the subscriber stations is of known construction. The telephone set FA and the data transmission unit DUE are selectively connected to a subscriber unit L1 or L2 of the switching center VST via a changeover means UE. The two switching matrix arrays KN connect the subscriber lines to a connector set D-VS. In the present case, the connector set is set up for supplementary data communication. All these devices are controlled by a central control unit ZST in a manner in itself known.

If one of the parties desires a connection, this is revealed by a line monitor (not shown) and a connection is switched through to a signaling set (not shown), which takes the dial digits and sets up the desired connection via the central control unit ZST. When selecting a code for data communication, the call is conducted via an appropriate connector set D-VS, instead of the conventional connector set, or the data mode is cut in a standard connector set.

Figure 2:
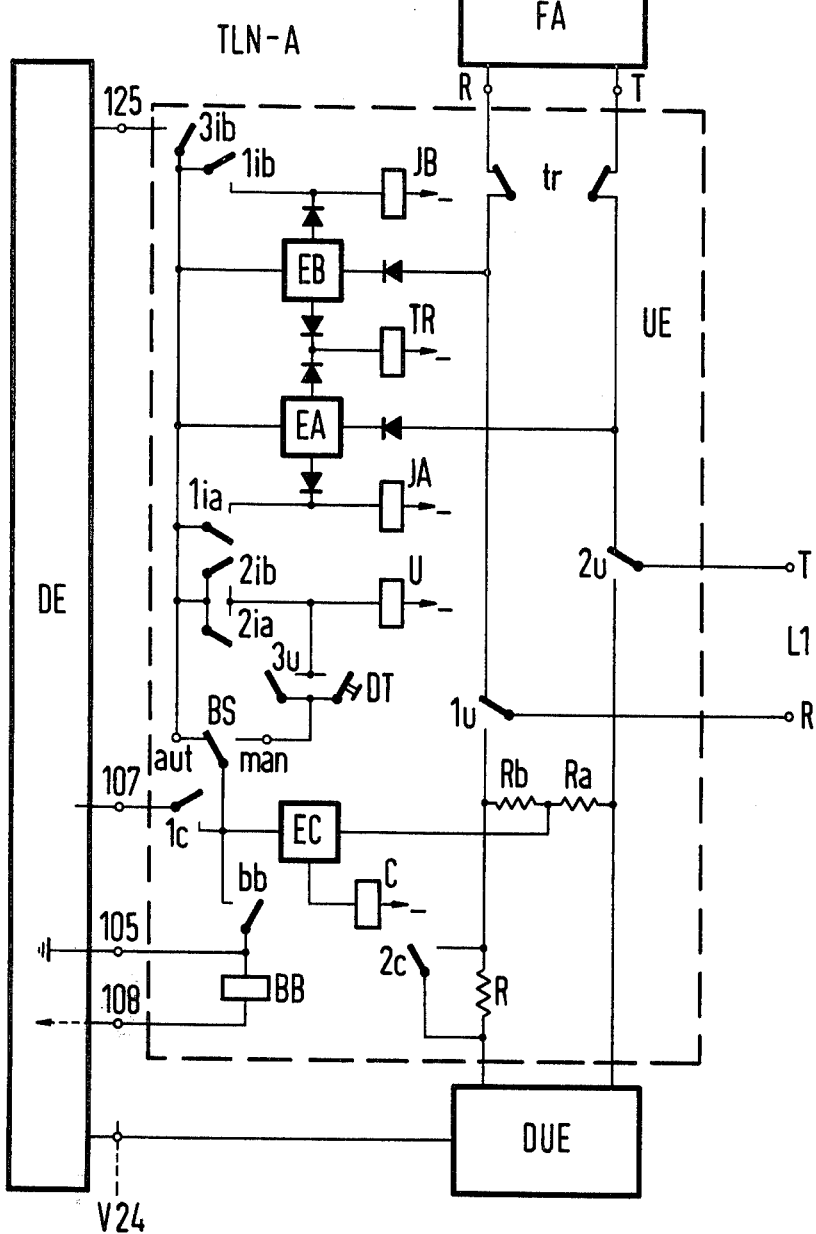
FIG. 2 is a schematic diagram of a subscriber station.

FIGS. 2 and 3 show further details of a subscriber station TLN and a connector set D-VS, as shown in FIG. 1.

Let it be assumed that a call has been set up from the subscriber station TLN-A in the manner described hereinabove to the subscriber station TLN-B via the connector set D-VS. After switching through the desired connection, which is reported by the central control unit ZST to the connector set D-VS via the terminal $d$, the relay PB starts to operate, thereby opening the contacts $3pb$ and $4pb$. This disconnects the T-wire and R-wire of the line leading to the subscriber station TLN-B from the repeating coil Ue, and using transmission bridge circuits SB1 and SB2 a plus potential is connected to the R-wire instead. This leads to the pickup of the relay TR via the receiver EB in the subscriber station TLN-B, which is constructed like TLN-A. Like the receiver EA, the receiver EB is designed such that both rear-position relays TR are immediately energized, while the relays JA and JB are not energized before the end of a control pulse acting thereupon. The relay TR disconnects with its contacts $tr$ the telephone set FA, thereby preventing the control pulse (applied, for example, to the R-wire) from acting on the receiver EA also via the loop of the telephone set FA. At the end of the positive control pulse sent via the R-wire, the relay JB likewise starts to operate when the mode selector switch BS is set on the position "aut" of the automatic selector. Otherwise, said control pulse remains ineffective (selector position "man").

In the event that the relay JB starts to operate in the called subscriber TLN-B, a holding circuit is closed with the contact $1ib$, the changeover relay U is switched into circuit with the contact $2ib$, and an incoming call is reported to the data terminal unit DE via the interface circuit 125. With its contacts $1u$ and $2u$, the relay U changes the subscriber line L2 over from the telephone set FA to the data transmission unit DUE. Due to the presence of the resistor R in the loop circuit, the loop current is reduced. This is detected in the connector set D-VS as an acknowledgement for the changeover that has taken place. Consequently, the monitoring relay BH connected to the transmission bridge circuit SB2 starts to operate, so that after the relay PB has dropped out, the relay DT can start to operate. This causes in a manner in itself known but not shown, the transmission of a data tone of, e.g., 2100 Hz to the calling subscriber station TLN-A.

If the answerback fails to appear, thereby indicating that the called station TLN-B is switched to the manual mode, then the calling relay R can start to operate after the relay PB has dropped out. The calling relay R switches ringing current to the outgoing interexchange trunk in a manner in itself known, but likewise not shown, until the called subscriber answers.

In the event that the data tone is sent to the calling subscriber station TLN-A, the latter indicates in a known manner to the subscriber the changeover of the distant station to the data communication mode, inviting him, in case of manual operation, to operate the data button DT. Thus, if the data terminal unit DE is ready for operation, the relay U of the changeover means UE is switched into circuit, and the switchover is brought about by means of the contacts $1u$ and $2u$. In like fashion, the relay AH of the transmission bridge circuit SA2 in the connector set D-VS thereupon starts to operate after the relay AN of the transmission bridge circuit SA1 has dropped out. Furthermore, the relay W is energized and with its contacts $1w$ to $4w$ it connects the wires of the incoming line L1 directly to those of the outgoing line L2, thereby connecting plus potential to both wires via the receiver E. The positive potential causes the relay C to pick up via the receiver EC in both subscriber stations. The contact $1c$ reports the readiness for operation to the data terminal unit DE and using contact $2c$ makes a low impedance connection of the transmission path via the interface circuit 107. The data transmission can now begin.

However, the data tone remains ineffective, if the calling subscriber station TLN-A operates in the automatic mode. Therefore, after the relay DT has dropped out, the relay PA is switched into circuit. Like relay PB, relay PA disconnects, with its contacts $2pa$ and $3pa$, the T-wire and R-wire from the transmission bridges and connects plus potential to the T-wire. Therefore, the relay TR and, at the end of the control pulse, the relay JA, can start to operate via the receiver EA in the changeover means UE of the calling subscriber station. Like relay JB, relay JA is inserted with its contact 1*ia* into a holding circuit and switches the changeover relay U into circuit with its contact 2*ia*. The subsequent switching processes are the same as those after throwing the relay U into circuit by means of the data button, so that after the relay PA has dropped at the end of the revertive pulse the switch relay W can start to operate via the contacts 1*pa* and *ah*.

If the called subscriber station TLN-B operates in the manual mode, the revertive pulse transmitted at first remains ineffective, and the subscriber is called in the usual manner, so that after reporting this subscriber the normal voice communication can be carried out. In this case, data communication is not possible until the called subscriber, upon being invited by the calling subscriber, operates his data button DT, so that the changeover relay U can start to operate in the manner described hereinabove and bring about the changeover from the telephone set FA to the data terminal unit DUE. The changeover acknowledgement associated therewith causes in the manner above described the transmission of the data tone to the calling subscriber and, in the automatic mode, of the revertive pulse as well.

During the data transmission the through-connected transmission path is subject to the supervision of the receiver E in the connector set D-VS. The latter reveals the moment when, via the interface circuit 108 in one of the subscriber stations, the readiness for operation of the data terminal unit DE is discontinued. Further, the relay BB using its contact *bb* disconnects the signal ground or common return, for example, because the data communication is terminated. The pickup of the receiver can therefore cause the switchback to voice communication, i.e., dropout of the relay W, but it can also cause in the known manner the release of the connection.

The illustration in FIGS. 2 and 3 is limited to the details necessary for a better understanding of the invention. In addition to the example shown, a series of practical examples are contemplated to implement the concept underlying the invention. This is particularly true of the relays employed for the control sequence, the control circuits of which are shown only schematically. Likewise, the type of control signaling for switching the changeover facilities can readily be implemented in various other manners in themselves known, for example, through AC signals or via separate supplementary control wires, without departing from the spirit of the invention. The embodiment shown in the drawing is particularly suited for data transmission methods utilizing DC signals, which can readily pass through the isolation circuitry disposed in the transmission path, for example, such as the repeating coil Ue of the connector set D-VS. However, all other prior art data transmission methods may likewise be employed.

What is claimed is:

1. Apparatus for telecommunication systems having transmission paths capable of accommodating different types of message signals produced through using different modes of communication wherein connector sets for a plurality of modes of communication are connectable to a connecting path and having changeover means for switching from one mode of communication to another mode of communication in a given connecting path, said changeover means including a mode selector for selecting either manual or automatic switching from one mode of communication to another, comprising:
    means in said connector sets for communicating a first switching signal to a called subscriber station for causing changeover to another mode of communication during automatic operation,
    first changeover means in said called subscriber station for switching responsive to said first switching signal, said called subscriber station from one mode of communication to another, said called subscriber station being in an automatic switching mode,
    means in said called subscriber station for evaluating said first switching signal and responsive to the changeover from one mode of communication to another for transmitting a first acknowledgement signal upon completion of said mode of communication changeover in said called subscriber station,
    first means in said connector sets for monitoring said first acknowledgement signal and for communicating a second switching signal to the calling subscriber station for causing changeover from said one mode of communication to another,
    second changeover means in said calling subscriber station for switching, responsive to said second switching signal, said calling subscriber station from said one mode of communication to another, said calling subscriber station being in an automatic switching mode,
    means in said calling subscriber station for monitoring said second switching signal and for producing a second acknowledgement signal upon completion of a changeover from said one mode of communication to another,
    second means in said connector sets for monitoring said second acknowledgement signal and producing an indication thereof and
    inquiry means in said connector sets for signalling, responsive to the monitored presence of said first and second acknowledgement signals, the occurrence of changeover from said one mode of communication to another at said calling and said called subscriber stations as an inquiry to said calling and called subscriber stations for the acceptance of the desired message signals and for monitoring the continuence of the readiness of data terminal equipment in said calling and called subscriber stations.

2. The apparatus defined in claim 1 wherein said connector sets include means for monitoring said first acknowledgement signal and for emitting a ringing signal upon the determination of the absence of said first acknowledgement signal.

3. The apparatus defined in claim 1 wherein said second switching signal comprises two partial signals, a first of said partial signals causing identification of changeover of said calling subscriber station and for indicating the need for manual call transfer in the case of manual operation, said second partial signal causing changeover in the case of automatic operation.

4. The apparatus defined in claim 1 wherein said connector sets include in addition monitoring means for determining the readiness for use of data terminal equipment in said calling and called subscriber stations upon completion of a connection and switching means for causing the change to another mode of communication upon a determination of lack of readiness of the data terminal equipment in either of said called or calling subscriber stations.

* * * * *